United States Patent
Nakayama

(10) Patent No.: US 9,921,044 B2
(45) Date of Patent: Mar. 20, 2018

(54) SURFACE PROPERTY MEASURING APPARATUS AND METHOD FOR CONTROLLING THE SAME

(71) Applicant: MITUTOYO CORPORATION, Kawasaki-shi, Kanagawa (JP)

(72) Inventor: Tatsuki Nakayama, Kure (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 445 days.

(21) Appl. No.: 14/264,416

(22) Filed: Apr. 29, 2014

(65) Prior Publication Data

US 2014/0326057 A1    Nov. 6, 2014

(30) Foreign Application Priority Data

May 1, 2013    (JP) ................................. 2013-096517

(51) Int. Cl.
| | |
|---|---|
| *G01B 5/28* | (2006.01) |
| *G01B 21/04* | (2006.01) |
| *G01B 3/00* | (2006.01) |
| *G01B 5/20* | (2006.01) |

(52) U.S. Cl.
CPC .............. *G01B 5/28* (2013.01); *G01B 3/008* (2013.01); *G01B 5/20* (2013.01); *G01B 21/047* (2013.01)

(58) Field of Classification Search
CPC . G01B 5/28; G01B 3/008; G01B 5/20; G01B 21/047
USPC .......................................................... 73/105
See application file for complete search history.

(56) References Cited

U.S. PATENT DOCUMENTS

| 5,321,977 A | 6/1994 | Clabes et al. |
| 5,517,307 A * | 5/1996 | Buehring ............... G01B 5/004 |
| | | 250/237 G |
| 2010/0288033 A1 | 11/2010 | Mizutani |
| 2012/0266475 A1 | 10/2012 | Nakayama et al. |

FOREIGN PATENT DOCUMENTS

JP    2012-225742    11/2012

OTHER PUBLICATIONS

European Search Report dated Sep. 26, 2014, 6 pages.

* cited by examiner

*Primary Examiner* — John Fitzgerald
*Assistant Examiner* — Rodney T Frank
(74) *Attorney, Agent, or Firm* — Rankin, Hill & Clark LLP

(57) ABSTRACT

A surface property measuring apparatus includes a control unit, configured to control operations of a roughness measuring instrument and a relative moving mechanism, including: a measuring force command module configured to output a measuring command; and a measuring force control module configured to control the direction and magnitude of the measuring force, wherein the measuring force control module instructs a measuring force application unit of the roughness measuring instrument to generate therein the measuring force whose magnitude and direction are designated by the measuring force command when a displacement speed of a measuring arm is equal to or slower than a predetermined threshold, and the measuring force control module instructs the measuring force application unit to generate therein a force in a direction in which the distal end of the measuring arm is raised upwards when the displacement speed of the measuring arm exceeds the predetermined threshold.

9 Claims, 10 Drawing Sheets

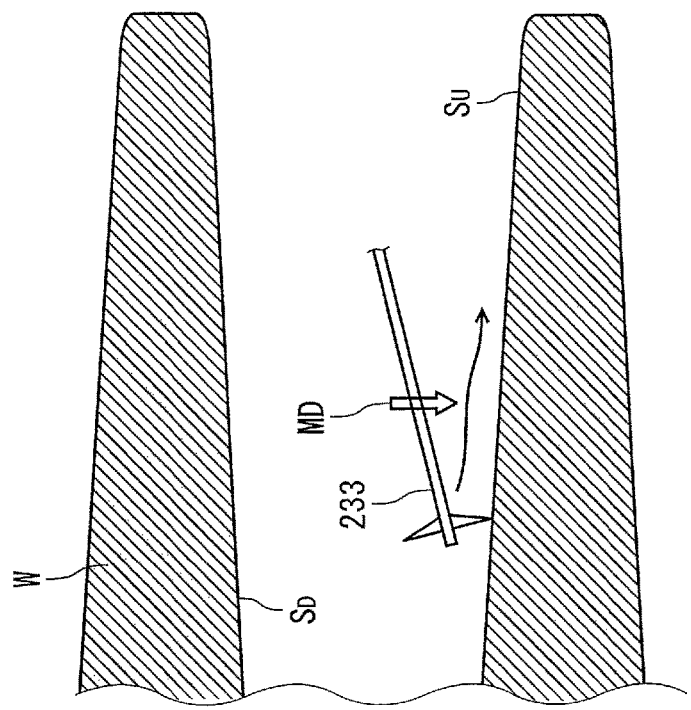
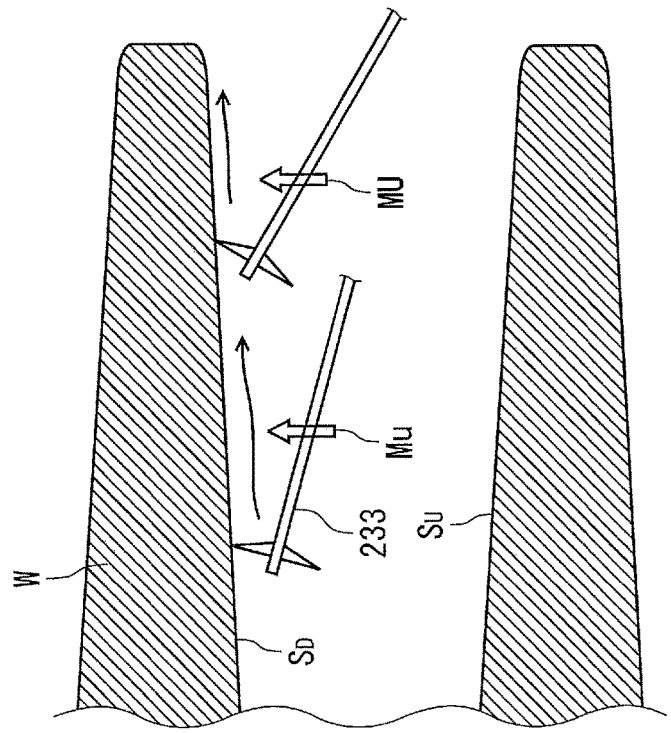

SURFACE PROPERTY MEASURING APPARATUS AND METHOD FOR CONTROLLING THE SAME

CROSS-REFERENCE TO RELATED APPLICATION(S)

This application is based upon and claims the benefit of priority from Japanese Patent Application No. 2013-096517, filed on May 1, 2013, the entire contents of which are incorporated herein by reference.

BACKGROUND

1. Field of the Invention

The present invention relates to a surface property measuring apparatus and a method for controlling the same apparatus.

2. Description of the Related Art

There is known a surface property measuring apparatus for measuring a property (roughness, waviness or the like) of a surface of an object to be measured by running a stylus so as to trace the surface of the measured object. For example, a surface property measuring apparatus disclosed in JP-A-2012-225742 includes a measuring arm which is supported so as to make an arc-like movement, a stylus provided at a distal end of the measuring arm, a measuring force application unit which applies a force to the measuring arm so that the stylus is brought into abutment with the measured object with a predetermined measuring force, a moving mechanism for moving the measuring arm relative to a stage, and a displacement detector which detects a displacement of the measuring arm as a result of the measuring arm having made an arc-like movement.

FIG. 9 shows the measuring arm of the surface property measuring apparatus. An upwardly directed stylus 11 and a downwardly directed stylus 12 are provided at a distal end portion (at a left end portion in FIG. 9) of the measuring arm 10 so as to project therefrom perpendicularly upwardly and downwardly, respectively, relative to a longitudinal direction of the measuring arm 10. The measuring arm 10 is supported so as to rotate about a rotating shaft 13.

A voice coil motor 20 is provided at a proximal end portion (a right end portion in FIG. 9) of the measuring arm 10. When the voice coil motor 20 is energized, the measuring arm 10 is biased in an arc direction (here, either of upward and downward directions) about the rotating shaft 13. (In this case, the voice coil motor 20 constitutes a measuring force application unit.)

FIGS. 10A and 10B show a way in which the measuring arm 10 traces a surface to be measured of an object to be measured, or a measured surface S of a measured object W to measure a property thereof.

In the case of the measured surface S lying below the measuring arm 10, a distal end of the measuring arm 10 is biased downwardly so that a distal end of the stylus 12 is brought into contact with the measured surface S and further, a certain measuring force is generated between the measured surface S and the stylus 12 (an arrow $M_D$ in FIGS. 10A and 10B).

On the contrary, in the case of the measured surface S lying above the measuring arm 10, the distal end of the measuring arm 10 is biased upwardly.

Here, when the measuring arm 10 moves to follow the measured surface S while tracing it, the measuring arm 10 has a limit angle at which it can follow the measured surface S. This limit angle at which the measuring arm 10 is allowed to follow the measured surface S will be referred to as a following limit angle.

FIG. 10A is a drawing showing a case where an inclination angle of the measured surface S is moderate. In this case, since the inclination angle of the measured surface is equal to or less than the following limit angle, the stylus 12 is allowed to make a tracing movement along the measured surface S while allowing the stylus 12 to be kept in contact with the measured surface S with a constant measuring force.

FIG. 10B is a drawing showing a case where the inclination angle of the measured surface S exceeds the following limit angle. In this case, since the inclination angle of the measured surface S exceeds the following limit angle, the measuring arm 10 cannot follow the measured surface S. Then, the stylus 12 moves away from the measured surface S to lose the contact therewith and is caused to float in the air above the measured surface S momentarily. However, as this occurs, a downward biasing force which results from a sum of a weight of the measuring arm 10 itself and a weight of the voice coil motor 20 is applied to the distal end of the measuring arm 10. Consequently, this downward biasing force rotates forcibly the measuring arm 10 as the distal end of the measuring arm 10 falls as it were.

Hereinafter, the fact that the measuring arm 10 rotates forcibly as the distal end of the measuring arm 10 falls as it were may be expressed from time to time as the "measuring arm falls."

There may exist a situation in which the stylus 12 loses the contact with the measured surface S to thereby float in the air above the measured surface S momentarily, whereafter the measuring arm 10 falls forcibly, which brings the stylus 12 into collision with the measured surface S. This causes a problem that the stylus 12 and the measured object W are damaged.

SUMMARY

An object of the invention is to provide a surface property measuring apparatus which can prevent an accident in which a stylus is brought into collision with a measured object.

According to the invention, there is provided a surface property measuring apparatus including:

a roughness measuring instrument configured to measure a surface property of a measured surface of a measured object by tracing the measured surface while being kept in contact with the measured surface, the roughness measuring instrument including:

- a measuring arm supported so as to make an arc-like movement about a rotating shaft as a fulcrum;
- a stylus provided at a distal end of the measuring arm;
- a displacement detector configured to detect a displacement of the measuring arm which occurs as a result of the measuring arm having made an arc-like movement; and
- a measuring force application unit configured to bias the measuring arm in a direction in which the measuring arm makes an arc-like movement to thereby apply a measuring force to the stylus;

a relative moving mechanism configured to move the roughness measuring instrument and the measured object three-dimensionally relative to each other so that the roughness measuring instrument traces the measured surface; and a control unit configured to control operations of the roughness measuring instrument and the relative moving mechanism, the control unit including:

a measuring force command module configured to output a measuring command which designates a direction and a magnitude of the measuring force; and a measuring force control module configured to control the direction and magnitude of the measuring force which is generated by the measuring force application unit by issuing a control signal to the measuring force application unit, wherein the measuring force control module monitors a displacement detection signal from the displacement detector and issues the control signal to the measuring force application unit so as to instruct the measuring force application unit to generate therein the measuring force whose magnitude and direction are designated by the measuring force command when a displacement speed of the measuring arm is equal to or slower than a predetermined threshold, and the measuring force control module applies a feedback to the measuring force application unit so as to instruct the measuring force application unit to generate therein a force in a direction in which the distal end of the measuring arm is raised upwards when the displacement speed of the measuring arm exceeds the predetermined threshold.

In this invention, the property measuring force control module includes preferably:

a measuring force command voltage generation module configured to generate a measuring force command voltage which is a voltage signal according to a value of the measuring force command;

a feedback signal generation module configured to generate a feedback signal which is a voltage signal which instructs the measuring force application unit to generate therein a force in a direction in which the distal end of the measuring arm is raised upwards;

a subtraction unit configured to subtract the feedback signal from the measuring force command voltage; and a determination circuit configured to determine based on a displacement signal from the displacement detector whether or not the displacement speed of the measuring arm exceeds the predetermined threshold; and the determination circuit inputs the feedback signal into the subtraction unit when the determination circuit determines that the displacement speed of the measuring arm exceeds the predetermined threshold.

In the invention, the feedback signal generation module is preferably made up of a frequency-voltage conversion circuit which generates a voltage signal according to a frequency value of the displacement detection signal from the displacement detector.

In the invention, a switch unit is preferably provided between the feedback signal generation module and the subtraction unit, and the determination circuit preferably turns on the switch unit when the displacement speed of the measuring arm exceeds the predetermined threshold, whereas when the displacement speed of the measuring arm is equal to or slower than the predetermined threshold, the determination circuit preferably turns off the switch unit.

According to the invention, there is provided a method for controlling a surface property measuring apparatus comprising: a roughness measuring instrument having a measuring arm which is supported so as to make an arc-like movement about a rotating shaft as a fulcrum, a stylus which is provided at a distal end of the measuring arm, a displacement detector configured to detect a displacement of the measuring arm configured to occur as a result of the measuring arm making an arc-like movement, and a measuring force application unit configured to bias the measuring arm in a direction in which the measuring arm makes an arc-like movement to thereby apply a measuring force to the stylus; and a relative moving mechanism configured to move the roughness measuring instrument and a measured object three-dimensionally relative to each other so that the roughness measuring instrument traces a measured surface of the measured object therealong, the method comprising:

controlling a direction and a magnitude of the measuring force which is generated by the measuring force generation unit by issuing a control signal based on a measuring force command which designates the direction and magnitude of the measuring force to the measuring force application unit; and monitoring a displacement signal from the displacement detector and issuing the control signal to the measuring force application unit so as to instruct the measuring force application unit to generate therein the measuring force whose direction and magnitude are designated by the control signal when a displacement speed of the measuring arm is equal to or slower than a predetermined threshold, whereas when the displacement speed of the measuring arm exceeds the predetermined threshold; and applying a feedback to the measuring force application unit so as to instruct the measuring force application unit to generate therein a force in a direction in which a distal end of the measuring arm is raised upwards.

The invention can prevent a fall of the measuring arm which is likely to bring the stylus into collision with the measured object.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIGS. 5A and 5B are drawings which show a way in which a measured object W having a downward surface $S_D$ and an upward surface $S_U$ is measured continuously.

DETAILED DESCRIPTION OF THE INVENTION

Figure 1:
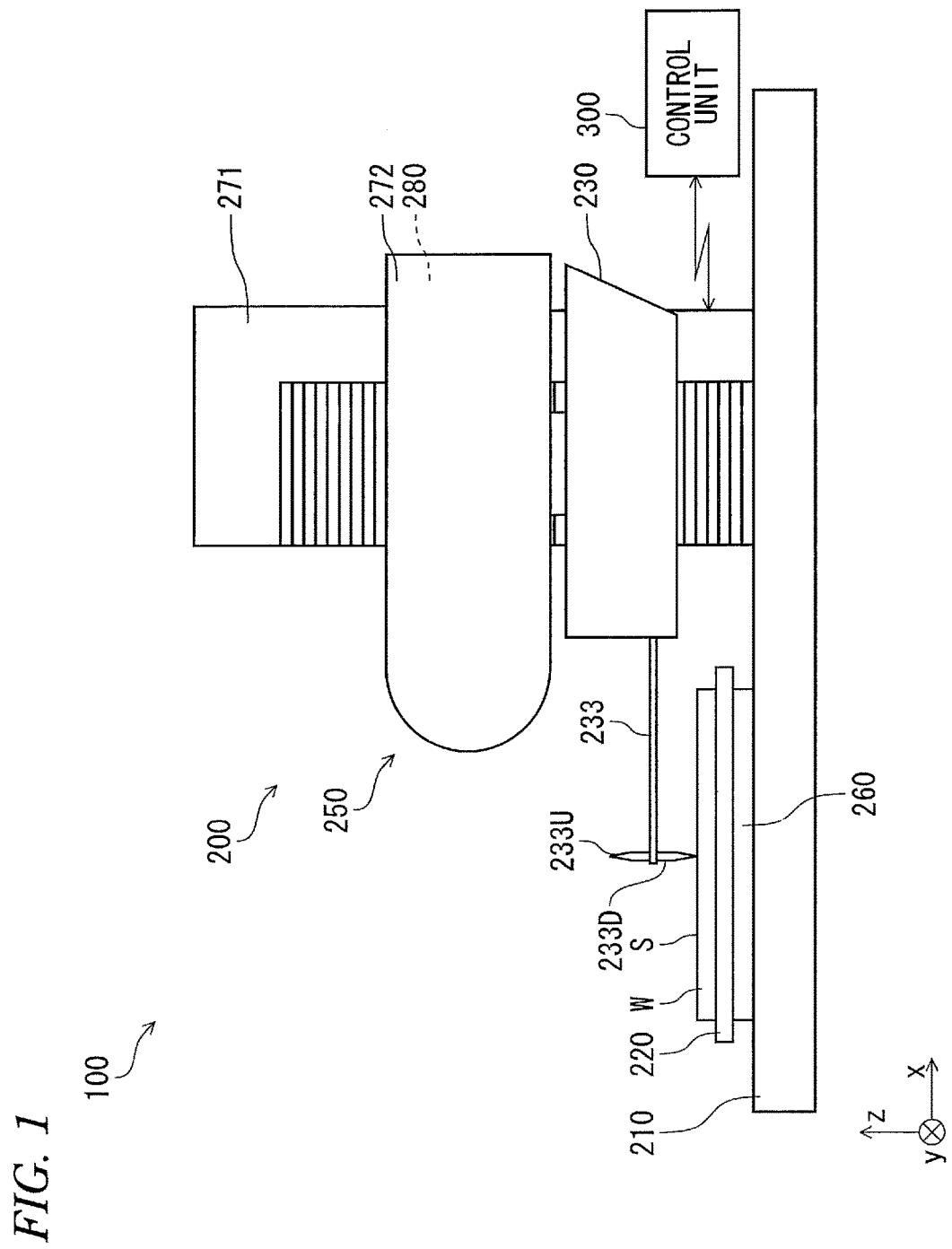
FIG. 1 is a drawing which shows a surface property measuring apparatus according to a first embodiment.

An embodiment of the invention is shown to be described by reference to reference numerals that are given to constituent elements of a surface property measuring apparatus according to the embodiment which are shown in accompanying drawings.

First Embodiment

FIG. 1 is a drawing which shows a surface property measuring apparatus 100.

The surface property measuring apparatus 100 includes a surface property measuring unit 200 and a control unit 300.

Although the configuration of the surface property measuring unit 200 is already known, the configuration will be described briefly.

The surface property measuring unit 200 includes a base 210, a stage 220 which is disposed on the base 210 and on an upper surface of which an object to be measured or measured object W rests, a roughness measuring instrument 230 which has a stylus which is brought into abutment with the measured surface S and which detects minute vertical movements of the stylus, and a relative moving mechanism 250 which moves the roughness measuring instrument 230 and the stage 220 relative to each other.

Firstly, the relative moving mechanism 250 will be described.

The relative moving mechanism 250 includes a Y-axis driving mechanism 260, a Z-axis driving mechanism 270, and an X-axis driving mechanism 280.

The Y-axis driving mechanism 260 is provided between the base 210 and the stage 220 and moves the stage 220 in one (the direction of a Y axis) of horizontal directions. Here, the Y-axis direction is a direction normal to a surface of a sheet of paper on which FIG. 1 is drawn. In addition, the Z-axis driving mechanism 270 includes a Z column 271 which is provided on the upper surface of the base 210 so as to be erected therefrom and a Z slider 272 which is provided so as to be raised up and down on the Z column 271 in a vertical direction (the direction of a Z axis) thereof. Although a detailed illustration of the Y-axis driving mechanism 260 and the Z-axis driving mechanism 270 is omitted, they may be made up of, for example, a feed screw mechanism which has a ball screw shaft and a nut member which is screwed on this ball screw shaft. A Y-direction position detector 261 (refer to FIG. 3) is additionally provided on the Y-axis driving mechanism 260 to detect a relative displacement between the base 210 and the stage 220. A Z direction position detector 273 (refer to FIG. 3) is additionally provided on the Z slider 270 to detect a rising or falling amount of the Z slider 272.

The X-axis driving mechanism 280 is provided in an interior of the Z slider 272 so as to move the roughness measuring instrument 230 in the X-axis direction. It is noted that the X-axis direction is a lateral direction on the surface of the sheet of paper on which FIG. 1 is drawn, that is, a direction which intersects the moving direction (the Y-axis direction) of the stage 220 and the moving direction (the Z-axis direction) of the slider 272 at right angles.

Figure 2:
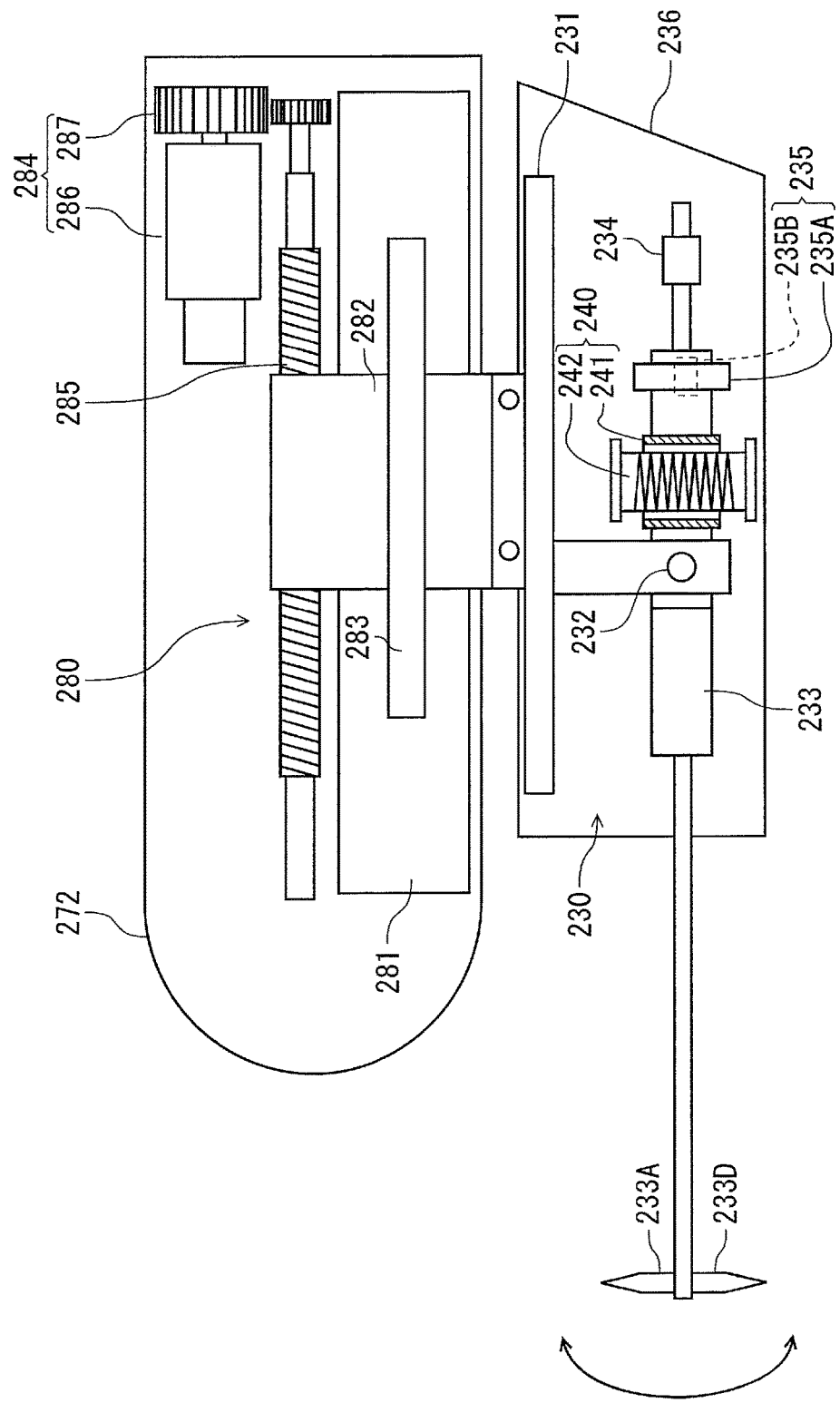
FIG. 2 is a drawing which shows the configurations of an X-axis driving mechanism and a roughness measuring instrument of the first embodiment.

FIG. 2 is a drawing which shows the configurations of the X-axis driving mechanism and the roughness measuring instrument. In FIG. 2, interiors of the Z slider 272 and a casing 236 of the roughness measuring instrument 230 are shown.

The X-axis driving mechanism 280 includes a guide rail 281, an X slider 282, an X-direction position detector 283, and a feed mechanism 284.

The guide rail 281 is provided so as to be fixed with respect to an X direction, and the X slider 282 is provided so as to slide on the guide rail 281.

The X-direction position detector 283 detects a position of the X slider 282 in the X-axis direction. The feed mechanism 284 has a feed screw shaft 285, a motor 286, a power transmission mechanism 287, and the X slider 282 is screwed on the feed screw shaft 285. A rotational force of the motor 286 is transmitted to the feed screw shaft 285 via the power transmission mechanism 287. The X slider 282 moves along the X-axis direction as the feed screw shaft 285 rotates.

Next, the roughness measuring instrument 230 will be described.

The roughness measuring instrument 230 includes a bracket 231, a measuring arm 233, styluses 233U, 233D, a balance weight, a displacement detector 235, a measuring force application unit 240 and the casing 236.

The bracket 231 is suspended from the X slider 282 in such a way as to be supported thereon. The measuring arm 233 is supported on the bracket 231 so as to swing (or to make an arc movement) in a vertical direction about a rotating shaft 232 as a fulcrum. The styluses 233U, 233D are provided at a distal end (a left end in FIG. 2) of the measuring arm 233 so as to project perpendicularly therefrom with respect to a longitudinal direction of the measuring arm 233. Here, the stylus 233U is provided so as to project upwards, while the stylus 233D is provided so as to project downwards. The balance weight 234 is provided at a proximal end (a right end in FIG. 2) portion of the measuring arm 233 so as to be adjusted with respect to its position.

The displacement detector 235 detects an amount of arc movement (an amount of displacement in the Z-axis direction) of the measuring arm 233. The displacement detector 235 has a scale 235A which has scale marks (not shown) which are provided curvilinearly along the direction of an arc movement made by the measuring arm 233, and a detection head 235B which is provided so as to be opposite to the scale 235A. The scale 235A is fixed to the measuring arm 233 so as to be displaced together with the measuring arm 233 at the proximal end portion of the measuring arm 233. Additionally, the detection head 235B is provided fixedly with respect to the bracket 231 by a support member, not shown. An arc movement of the measuring arm is detected by the detection head 235B, and the detection head 235B outputs the number of pulse signals (displacement detection pulse signals) which correspond to an amount of arc movement made by the measuring arm 233.

The measuring force application unit 240 is a voice coil motor which is disposed closer to a proximal end of the measuring arm 233 and applies a force to the measuring arm 233 so that the distal end of the measuring arm 233 is biased upwards or downwards.

The measuring force application unit 240 is made up of a magnet 241 and a voice coil 242. The magnet 241 has a cylindrical shape and is provided in a position along the length of the measuring arm 233. The voice coil 242 is provided so as to extend through the magnet 241. The voice coil 242 is provided fixedly and may be fixed to, for example, the bracket 231.

When the voice coil 242 is energized, a magnetic force is generated in the voice coil 242. Then, the distal end of the measuring arm 233 is biased upwards or downwards by an interaction between the voice coil 242 and the magnet 241. As this occurs, when the amount of current (the value of current) which flows to the voice coil 242 changes, the intensity of a biasing force applied to the measuring arm changes. Consequently, according to this configuration, the voice coil 242 performs a function as a measuring force application unit and applies and controls a contact force of the stylus with the measured surface S, that is, a measuring force.

In addition, by switching directions of the flow of current in the voice coil 242, the direction of the biasing force applied to the measuring arm 233 is switched. This means, for example, that the biasing force which biases the distal end of the measuring arm 233 upwards is changed so as to bias it downwards. Consequently, the measuring force application unit 240 doubles as a measuring posture switching unit.

In the configuration that has been described heretofore, the roughness measuring instrument 230 can be moved three-dimensionally relative to the measured object W by the relative moving mechanism 250 (the Y-axis driving mechanism 260, the Z-axis driving mechanism 270, the X-axis driving mechanism 280). Then, the roughness measuring instrument 230 is moved along the measured surface S so as to trace it while the stylus 233U or 233D of the roughness measuring instrument 230 is kept contact with the measured surface S. Minute vertical movements of the stylus 233U or 233D that occur while the stylus is tracing the measured surface S are detected by the displacement detector 235 as a swing amount of the measuring arm 233. Consequently, it is possible to measure not only a contour of the measured object but also a surface property (minute irregularities, waviness) of the measured surface.

Here, the measuring arm 233 of the roughness measuring instrument 230 is required to swing sharply in response to minute irregularities on the measured surface. Consequently, the measuring arm 233 cannot be supported fixedly. With supported on the rotating shaft 232 so as to swing thereabout, the measuring arm 233 is supported to be balanced subtly by the balance weight 234, the biasing force from the measuring force application unit 240 and a reaction force from the measured surface.

Figure 3:
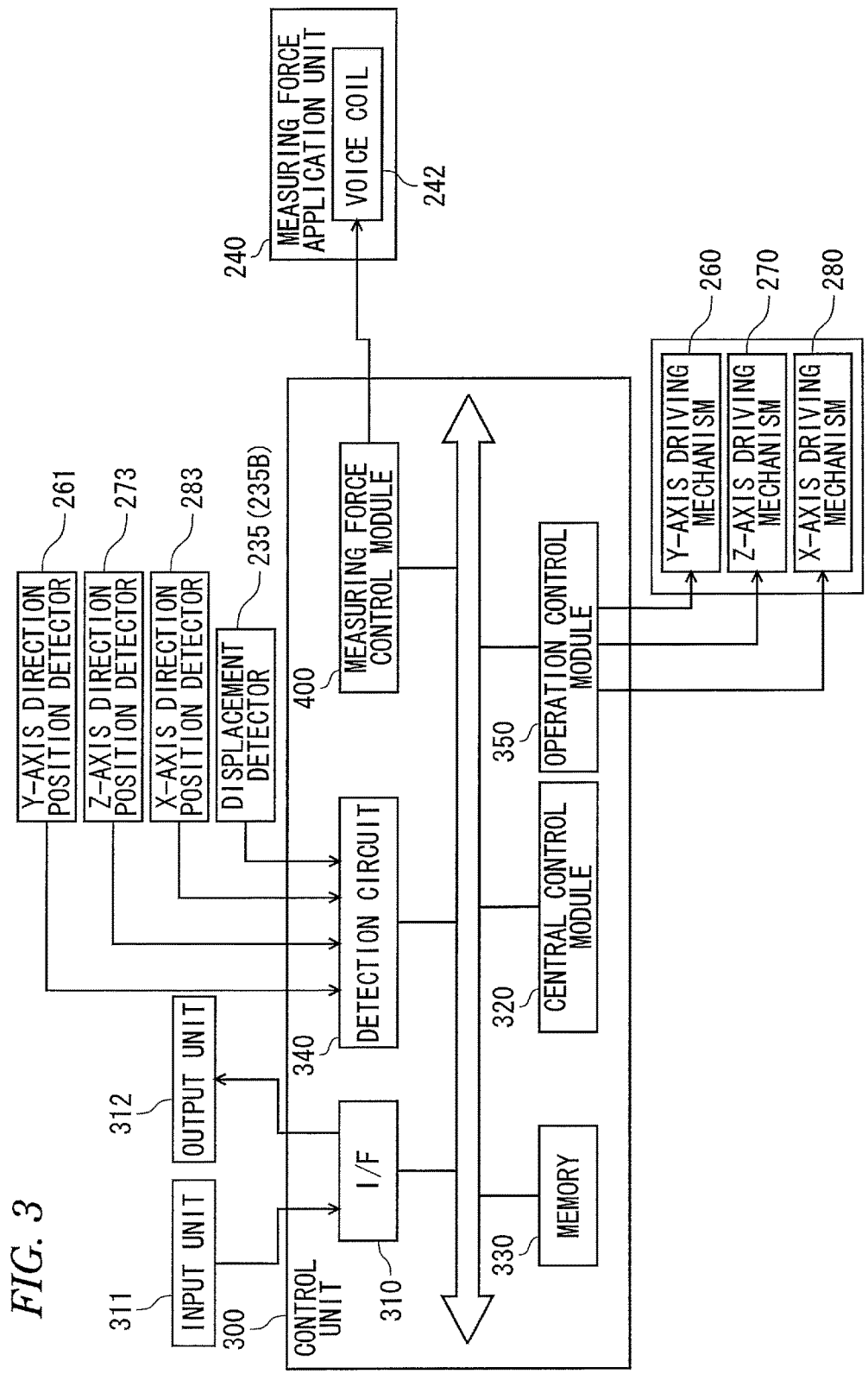
FIG. 3 is a functional block diagram of a control unit of the first embodiment.

Next, FIG. 3 shows a functional block diagram of the control unit 300.

The control unit 300 includes an interface module 310, a central control module (a measuring force command module) 320, a memory 330, a detection circuit module 340, an operation control module 350, and a measuring force control module 400.

The control unit 300 is connected to an external input unit 311 and an output unit 312 via the interface module 310. The input unit 311 may be a keyboard, a mouse or any of data read means of various types. The output unit 312 may be a display, a printer or any of arithmetic operation devices of various types which obtain a configuration of the measured surface through data operation.

The central control module 320 is a so-called CPU (central processing unit) and controls in a consolidate fashion an overall operation of the control unit 300. The memory 330 is a ROM or a RAM, stores various operation control programs and becomes a buffer when data is inputted or outputted.

The detection circuit module 340 detects signals (for example, pulse signals) from the Y-direction position detector 261, the Z-direction position detector 273, the X-direction position detector 283 and the displacement detector 235 and outputs them to the outside as measured data via the interface module 310.

The operation control module 350 issues driving signals to the Y-axis driving mechanism 260, the Z-axis driving mechanism 270 and the X-axis driving mechanism 280 to move the roughness measuring instrument 230 along the measured surface S so as to trance it. Namely, after having received a command from the central control module 320, the operation control module 350 outputs a driving pulse individually to the Y-axis driving mechanism 260, the Z-axis driving mechanism 270 and the X-axis driving mechanism 280.

(Configuration of Measuring Force Control Module)

Figure 4:
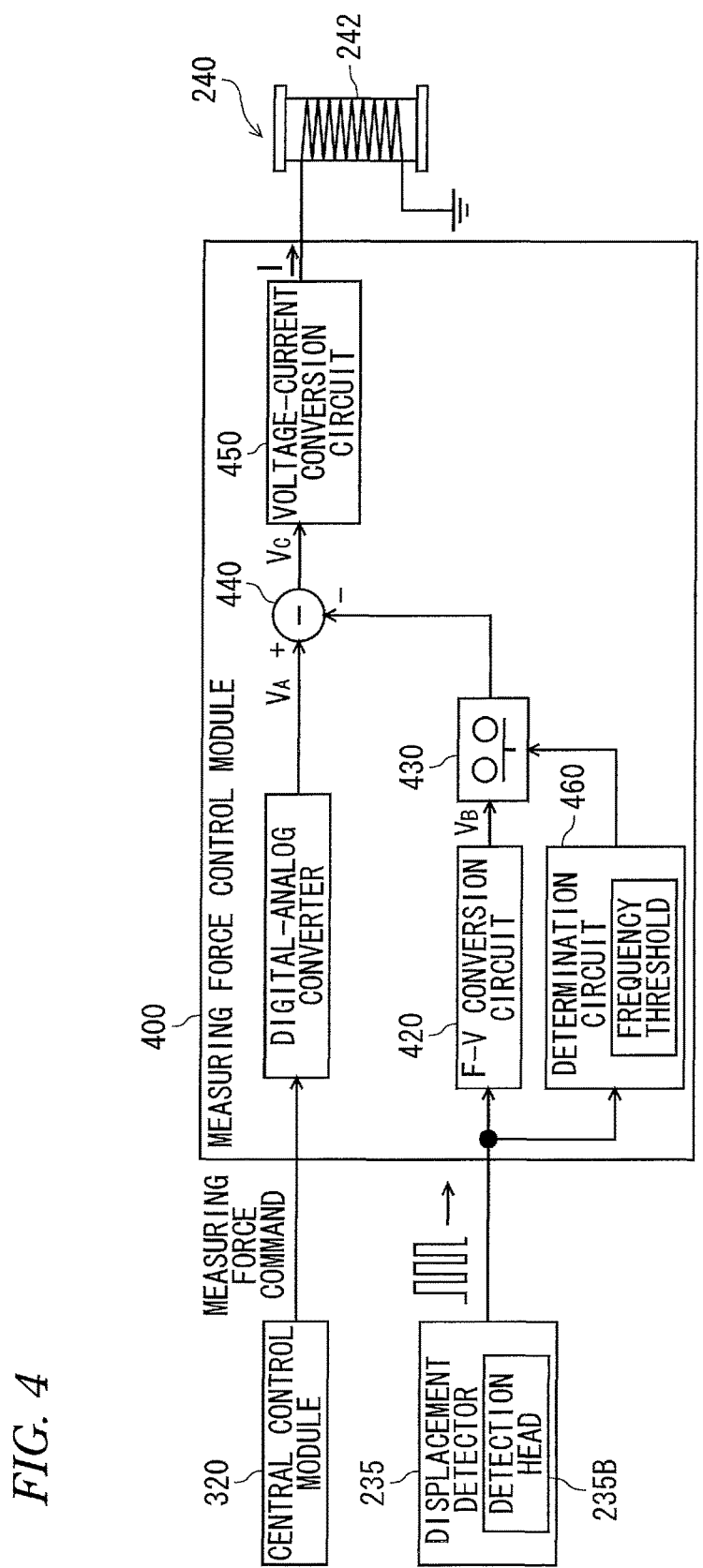
FIG. 4 is a functional block diagram of a measuring force control module.

FIG. 4 is a functional block diagram of the measuring force control module.

The measuring force control module 400 will be described. The measuring force control module 400 controls the magnitude and direction of a measuring force by controlling a control current I which is applied to the voice coil 242 of the measuring force application unit 240. A measuring force command from the central control module 320 and a displacement detection pulse from the displacement detector 235 are inputted into the measuring force control module 400, controlling the value of a control current I which is applied to the voice coil 242 based on the measuring force command and the displacement detection pulse.

The measuring force control module 400 includes a digital-analog converter (a measuring force command voltage generation module) 410, a frequency-voltage conversion circuit (a feedback signal generation module) 420, a switch unit 430, a subtraction module 440, a voltage-current conversion circuit 450 and a determination circuit 460.

The digital-analog converter 410 receives a measuring force command from the central control module 320 and outputs a voltage signal $V_A$ according to the measuring force command. Here, the digital-analog converter 410 constitutes a measuring force command voltage generation module. The voltage signal $V_A$ is inputted to an addition-side terminal of the subtraction module 440. When referred to herein, the measuring force command includes a command which designates a magnitude of a measuring force (contact stress) with which the styluses 2330, 233D press against the measured surface S and additionally a command which designates a direction (a measuring posture) of a biasing force which biases the distal end of the measuring arm 233 upwards or downwards. When the configuration of the measured object is known based on, for example, design data of the measured object, the central control module 320 outputs a measuring force command which instructs the styluses 233U, 233D to trace the surface of the measured object with a constant measuring force.

Here, the central control module 320 constitutes a measuring force command module.

Additionally, the voltage signal $V_A$ is a signal in which a measuring force command from the central control module 320 is converted to a voltage value according to the measuring force command. In this invention, the voltage signal $V_A$ from the digital-analog converter 410 is referred to as a measuring force command voltage from time to time.

A displacement detection pulse from the displacement detector 235 is inputted into the frequency-voltage conversion circuit 420. The frequency-voltage conversion circuit 420 outputs a voltage signal $V_E$ according to the frequency of the displacement detection pulse. The displacement detector 235 detects an amount of arc movement made by the measuring arm 233, and as the measuring arm 233 makes a faster arc movement, the frequency of the displacement detection pulse increases to a higher level.

On the contrary, as the measuring arm 233 makes a slower arc movement, the frequency of the displacement detection pulse decreases to a lower level. Consequently, as the measuring arm 233 makes a faster arc movement, the voltage signal $V_B$ from the frequency-voltage conversion circuit 420 increases to a higher level, whereas as the measuring arm 233 makes a slower arc movement, the voltage signal $V_B$ from the frequency-voltage conversion circuit 420 decreases to a lower level.

In other words, the voltage signal $V_B$ corresponds to a feedback signal in which the speed of arc movement of the measuring arm 233 is converted into a voltage. Consequently, in this specification, the voltage signal $V_B$ from the frequency-voltage conversion circuit 420 is referred to as a feedback voltage signal from time to time.

Here, the frequency-voltage conversion circuit 420 constitutes a feedback signal generation module.

The switch unit 430 is provided between the frequency-voltage conversion circuit 420 and the subtraction module 440. The voltage signal $V_B$ from the frequency-voltage conversion circuit 420 is imputed into a subtraction side terminal of the subtraction module 440 via the switch unit 430. Although the switch unit 430 is controlled to be turned on and off according to the results of a determination made by the determination circuit 460, the details thereof will be described later. The switch unit 430 may be, for example, a semiconductor switch such as a MOSFET or the like or may, of course, be a mechanical switch.

The subtraction module 440 subtracts the voltage signal $V_B$ from the voltage signal $V_A$ to generate a voltage signal $V_C$ and outputs this voltage signal $V_C$ to the voltage-current conversion circuit 450. The voltage signal $V_A$ is a voltage signal which is outputted from the digital-analog converter 410 in response to the measuring force command.

The voltage signal $V_B$ is a voltage signal (a feedback voltage signal) which is outputted from the frequency-voltage conversion circuit 420 according to the speed of arc movement of the measuring arm 233. The voltage signal $V_C$ which is generated by subtracting the voltage signal $V_B$ from the voltage signal $V_A$ becomes a voltage signal which controls the direction and magnitude of a force generated in the measuring force application unit. Consequently, in this specification, the voltage signal $V_C$ from the subtraction module 440 is also referred to as a control voltage signal $V_C$ from time to time.

The voltage-current conversion circuit 450 generates a control current I according to the voltage level of the control voltage signal $V_C$ and applies this control current I to the voice coil motor 242.

The determination circuit 460 controls the switch unit 430 so as to be turned on and off. A displacement detection pulse from the displacement detector 235 is inputted into the determination circuit 460, and the determination circuit 460 turns on and off the switch unit 430 according to the level, high or low, of the frequency of the displacement detection pulse that is inputted thereinto.

A predetermined frequency threshold is set in the determination circuit 460. The determination circuit 460 determines whether or not the frequency of the displacement detection pulse that is inputted thereinto exceeds the frequency threshold. Then, when it determines that the frequency of the displacement detection pulse exceeds, the determination circuit 460 turns on (or closes) the switch unit 430. When the switch unit 430 is turned on (or closed), the feedback voltage $V_B$ is allowed to be inputted into the subtraction module 440.

On the other hand, when the frequency of the displacement detection pulse is equal to or less than the frequency threshold, the determination circuit 460 turns off (or opens) the switch unit 430. When the switch unit 430 is turned off (or opened), the feedback voltage signal $V_B$ is not allowed to be inputted into the subtraction module 440.
(Description of Operation)

Next, the operation of the first embodiment having the configuration described heretofore will be described.

Since a basic operation of a tracing measurement is the same as that of the prior art, hereinbelow, the operation of the measuring force control module 400 which constitutes a characteristic part of this embodiment will be described mainly. The operation of the measuring force control module 400 will be described by reference to some typical cases which appear while a measuring operation is performed.
(Switching Operation of Measuring Directions (Measuring Postures))

In measuring the surface of the measured object, there is a situation in which the measuring direction (the measuring posture) is changed. For example, as shown in FIGS. 5A and 5B, there is a situation in which an object to be measured or a measured object W has a downward surface $S_D$ and an upward surface $S_D$, and the downward surface $S_D$ is traced for measurement (FIG. 5A), whereafter continuously, the upward surface $S_U$ is traced for measurement (FIG. 5B). In such a case, when the downward surface $S_D$ is traced for measurement (FIG. 5A), an upward biasing force (measuring force) needs to be applied to the distal end of the measuring arm 233 (as indicated by an arrow $M_U$ in FIGS. 5A and 5B), whereas when the upward surface $S_U$ is traced for measurement (FIG. 5B), a downward biasing force (measuring force) $M_D$ needs to be applied to the distal end of the measuring arm 233. Consequently, when the measuring operation is shifted from the state shown in FIG. 5A to the state shown in FIG. 5B, the direction of the measuring force is switched from the upward direction ($M_U$) to the downward direction ($M_D$).

In this invention, although whether the measured surface S is upward or downward does not have to be defined strictly, for example, in the event that a normal vector which is directed from one point on the measured surface S into the space has a perpendicularly downward component, the measured surface S may be defined as being the downward surface $S_D$. On the contrary, the normal vector which is directed from one point on the measured surface S into the space has a perpendicularly upward component, then, the measured surface S may be defined as being the upward surface $S_U$.

Figure 6A:
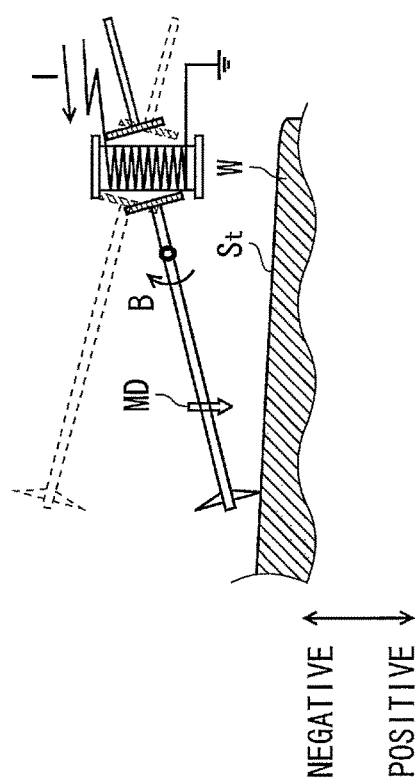
FIGS. 6A and 6B are drawings which explain the polarity of a sign given to a signal.
Figure 6B:
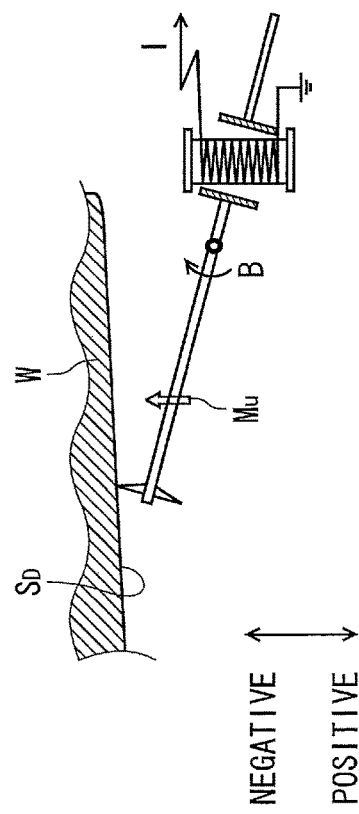

As a matter of convenience, the sign of a measuring force command when the measuring force is upward ($M_U$) is referred to as negative. It is understood that the control current I which flows to the voice coil 242 in this state has a negative direction (refer to FIG. 6A). Next, the sign of a measuring force command when the measuring force is changed to be downward ($M_D$) as shown in FIG. 6B is referred to as positive. It is understood that the control I which flows to the voice coil 242 in this state has a positive direction (refer to FIG. 6B). The direction of the control current I which flows to the voice coil 242 is reversed when the direction of the measuring force is shifted from the state shown in FIG. 6A to the state shown in FIG. 6B.

When the sign of the measuring force command is reversed, the downward biasing force (measuring force) $N_D$ is applied quickly and drastically to the distal end of the measuring arm 233. Further, the gravity is also applied to the measuring arm 233, and therefore, the measuring arm is likely to be displaced downward quickly and drastically. However, in this respect, in this embodiment, a feedback is applied so as to suppress the displacement speed of the measuring arm 233 to a speed which is equal to or less than a predetermined value.

There is a method in which the current flowing to the voice coil 242 is reduced gradually to be zero, while a positive current is caused to flow gradually. However, in this case, too, in the event that the current flowing to the voice coil 242 becomes zero, since the force which supports the weight of the measuring arm 233 is lost, the measuring arm falls momentarily then to be displaced downwards abruptly.

An issuing order of signals will be described sequentially.

Let's presume that in changing the direction of the measuring force from the upward ($M_U$) direction to the downward ($M_D$) direction, the measuring force command from the central control module 320 is changed from negative to positive. The measuring force command is converted into an analog voltage signal $V_A$ according to the command value by the digital-analog converter 410 for output. The sign of a voltage command value (the voltage signal $V_A$) is referred to as positive when the measuring force command is positive. The voltage signal $V_A$ is inputted into the voltage-current conversion circuit 450 via the subtraction module 440, and a control current I according to the magnitude of the voltage signal $V_A$ is applied to the voice coil 242. In this way, when the control current I according to the measuring force command is applied to the voice coil 242, the downward biasing force (measuring force) $M_D$ is applied to the distal end of the measuring arm 233. Since the downward biasing force (measuring force) $M_D$ and the gravity are applied to the distal end of the measuring arm 233, the distal end of the measuring arm 233 is displaced downwards quickly.

In this moment, the quick (downward) displacement of the distal end of the measuring arm 233 is detected by the displacement detector 235, and a displacement signal pulse issued on detection of the downward displacement is then inputted into the frequency-voltage conversion circuit 420 and the determination circuit 460. Here, the quick downward displacement of the distal end of the measuring arm 233 increases quite high the frequency of the displacement detection pulse, and it is understood that the frequency exceeds the frequency threshold.

As this occurs, determining that the frequency of the displacement detection pulse exceeds the frequency threshold, the determination circuit 460 turns on (or closes) the switch unit 430. At the same time, the frequency-voltage conversion circuit 420 converts the frequency of the displacement detection pulse to a voltage signal $V_B$ according thereto. In this way, the voltage signal $V_B$ generated is inputted into the subtraction-side terminal of the subtraction module 440.

In the subtraction module 440, a control voltage $V_C$ is generated as resulting from the feedback voltage $V_B$ being subtracted from the measuring force command voltage $V_A$. As this occurs, since the feedback voltage $V_B$ is negative feedback, the feedback voltage $V_B$ generates an opposite action to the downward displacement (or the fall) of the distal end of the measuring arm 233. Namely, the feedback voltage signal $V_B$ acts to lift up the distal end of the measuring arm 233 upwards (as indicated by an arrow B in FIG. 5B), whereby the quick and drastic downward displacement (fall) of the distal end of the measuring arm 233 is suppressed. In this way, the measuring posture of the measuring arm 233 can be shifted from the state in which the upward biasing force is applied thereto to the state in which the downward biasing force is to be applied thereto at a predetermined speed or slower.

(Tracing Measurement Operation (Part 1))

Next, the operation will be described which occurs when the measured surface S is traced for measurement.

Figure 10A:
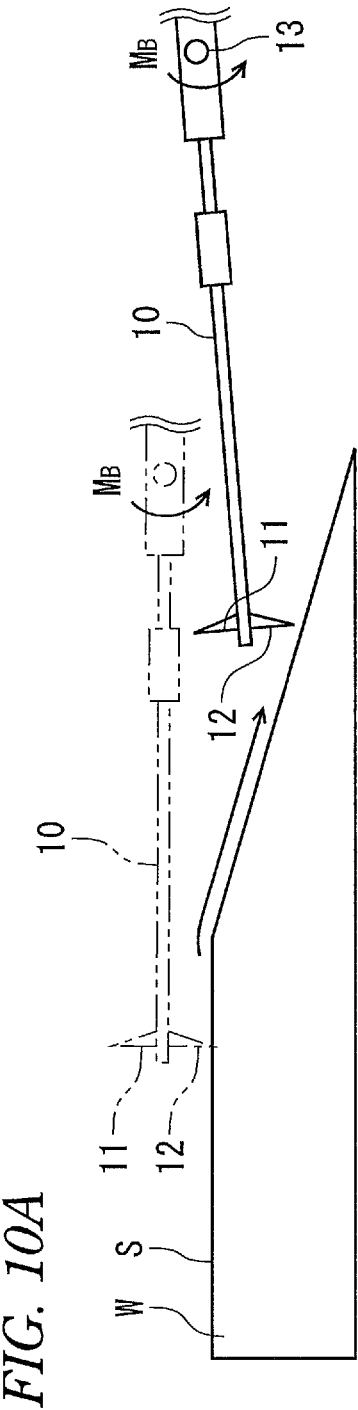
FIGS. 10A and 10B are drawings which explain a problem with a measurement in which a measured surface S is traced to measure a property thereof by the measuring arm.
Figure 10B:
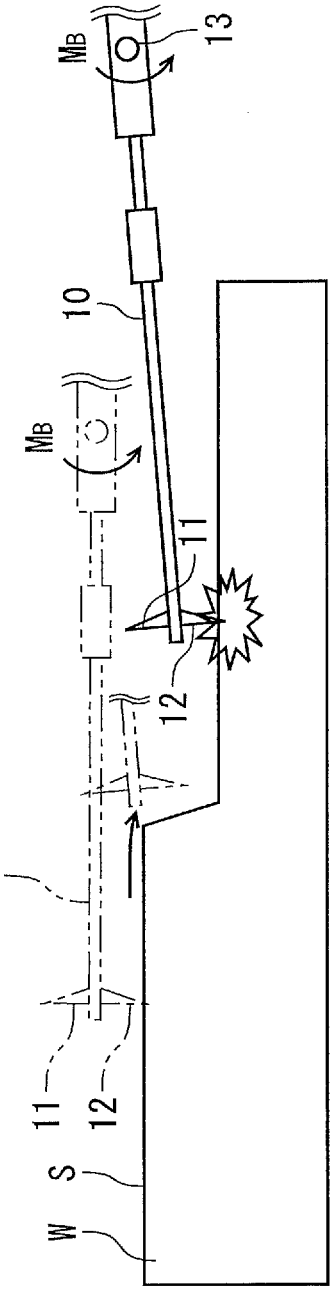

Firstly, as shown in FIG. 10A, a case is considered where the inclination angle of a measure surface S is moderate and is hence equal to or less than a following limit angle. For a later comparison, it is understood that the measured surface S is an upward surface S. When the inclination angle is moderate and is equal to or less than the following limit angle, the resulting measurement operation becomes the same as a conventional measurement operation.

Figure 7:
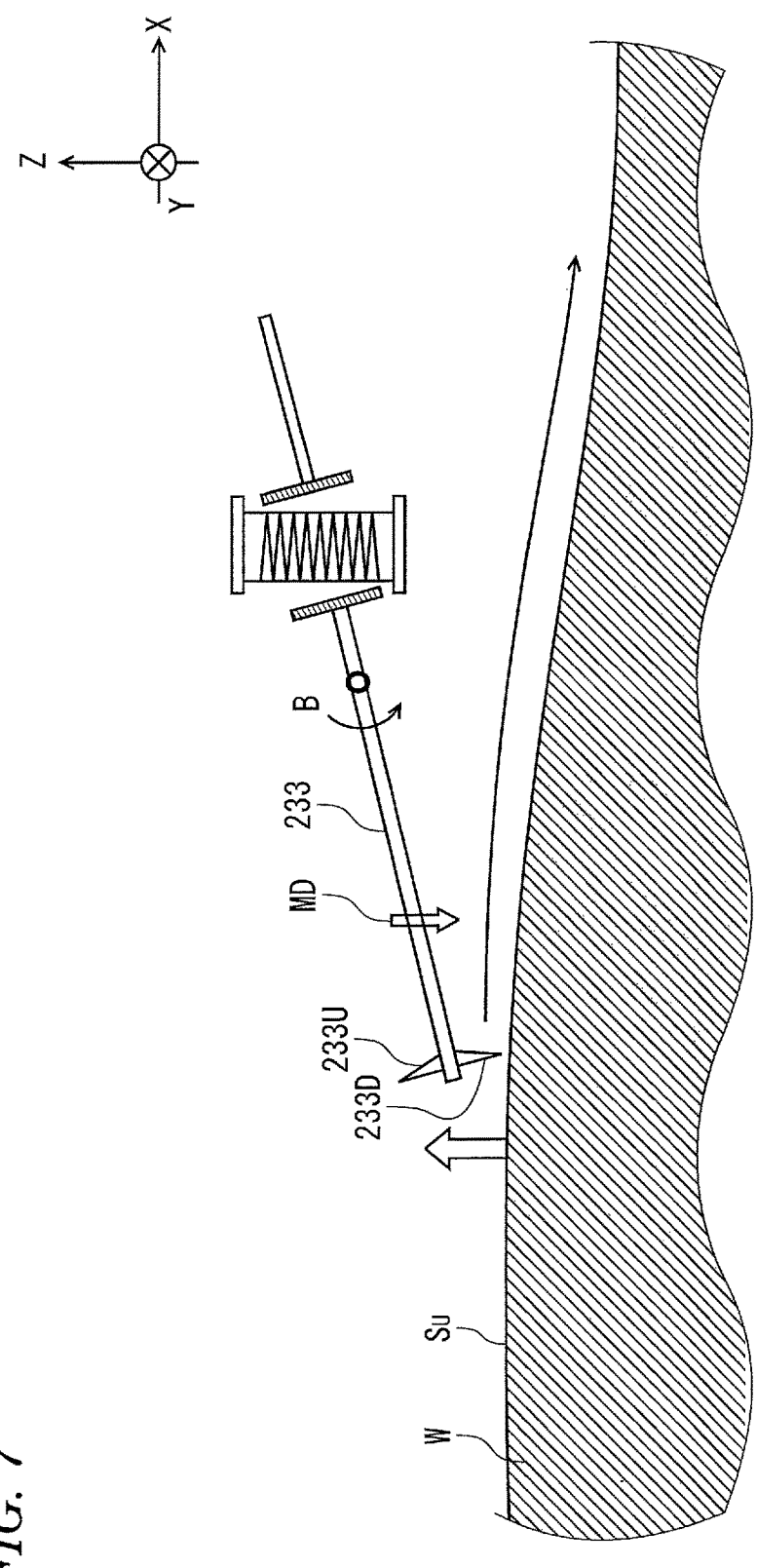
FIG. 7 is a drawing which shows away in which a measured surface having a moderate inclination angle is traced to measure a property thereof.

In starting a tracing measurement, firstly, as shown in FIG. 7, the stylus 233D is brought into contact with an upward measured surface $S_U$ with a predetermined measuring force $M_D$. As this occurs, the central control module 320 reads out the design data of the measured object W which is stored in the memory 330 and a measuring part program which is set in advance and sends to the operation control module 350 a command to instruct it to move the stylus 233D to a measurement starting point based on what is read out of the memory 330. The operation control module 350 drives the Y-axis driving mechanism 260, the Z-axis driving mechanism 270 and the X-axis driving mechanism 280 to move the roughness measuring instrument 230. The central control module 320 sends to the measuring force control module 400 a command to instruct it to generate a constant measuring force when the stylus 233D reaches a position directly above the measurement starting point.

Since the measured surface S is the upward surface $S_U$ in this state, the central control module 320 sends to the measuring force control module 400 a command to instruct it to bias the distal end of the measuring arm 233 downwards. The operation in which the distal end of the measuring arm 233 is biased downwards by the measuring force command to generate a downward biasing force is the same as the "switching operation of measuring directions" described above. Namely, a feedback is given to the quick and drastic downward displacement (fall) of the measuring arm 233, whereby the distal end of the measuring arm 233 is displace downwards gradually at the predetermined speed or slower.

Then, as shown in FIG. 7, the stylus 233D comes into abutment with the upward measured surface $S_U$. As this occurs, a sum of the gravity resulting from its own weight of the measuring arm 233 and the downward biasing force from the measuring force application unit (the voice coil motor) 240 is applied to the stylus 233D. Additionally, an upward reaction force is applied to the stylus 233D from the upward measured surface $S_U$. This allows a distal end of the stylus 233D and the upward measured surface $S_U$ to be brought into contact with each other at a predetermined measuring force. Although it is needless to say this, the measuring arm 233 is supported from therebelow by the application of the upward reaction force from the upward measured surface $S_U$ thereto and is then prevented from falling.

In tracing the upward measured surface $S_U$ therealong (from left to right on the surface of a sheet of paper on which FIG. 7 is drawn) in the X direction, the central control module 320 sends to the operation control module 350 a moving command to instruct it to move the stylus 233D in the X direction and the Z direction based on the design data of the measured object and the measuring part program. Then, the X-axis driving mechanism 280 and the Z-axis driving mechanism 270 are driven to move the stylus 233D (the measuring arm 233) so as to trace the upward measured surface $S_U$ therealong in the X direction.

Amounts in which the X-axis driving mechanism 280 and the Z-axis driving mechanism 270 are driven are detected by the X-direction position detector 283 and the Z-direction position detector 273, respectively, and respective detection values are collected at the detection circuit module 340. Further, the stylus 233D moves vertically due to minute irregularities and waviness on the upward measured surface $S_U$, and these vertical movements of the stylus 233D are detected by the displacement detector 235 as arc movements of the measuring arm 233. A detection signal (a displacement detection pulse signal) from the displacement detector 235 is also collected at the detection circuit module 340. The detection values which are collected at the detection circuit module 340 are outputted to the outside from the output unit 312 as measuring data.

Here, even through there is an inclination in the upward measured surface $S_U$ shown in FIG. 7, the inclination angle thereof is moderate. Consequently, by causing the roughness measuring instrument 230 to move to trace the upward measured surface $S_U$ in the Z direction by the Z-axis driving mechanism 270 while causing the roughness measuring instrument 230 to move to trace the upward measured surface $S_U$ in the X direction by the X-axis driving mechanism 280, the roughness measuring instrument 230 can be caused to follow the upward measured surface $S_U$. Then, the stylus 233D keeps the contact with the upward measured surface $S_U$ while maintaining the predetermined measuring force applied thereto. As this occurs, although the stylus 233D slightly moves up and down due to minute irregularities and waviness on the upward measured surface $S_U$, the displacement speed there of slow. Although such arc-like movements of the measuring arm 233 are detected by the displacement detector 235 and the displacement detection pulses thereof are inputted into the frequency-voltage conversion circuit 420 and the determination circuit 460 of the measuring force control module 400, in the event that the inclination angle of the upward measured surface $S_U$ is equal to or less than the following limit angle, the frequencies of the displacement detection pulses never exceed the frequency threshold in the threshold determination in the determination circuit 460. Consequently, the switch unit 430 is kept turned off (or opened), that is, the feedback control is suspended.

In this case, only the control current I is applied to the measuring force application unit 240 based on the measuring force command from the central control module 320, and therefore, a tracing measurement based on the predetermined measuring force according to this command is executed.

(Tracing Measurement Operation (Part 2))

Figure 8:
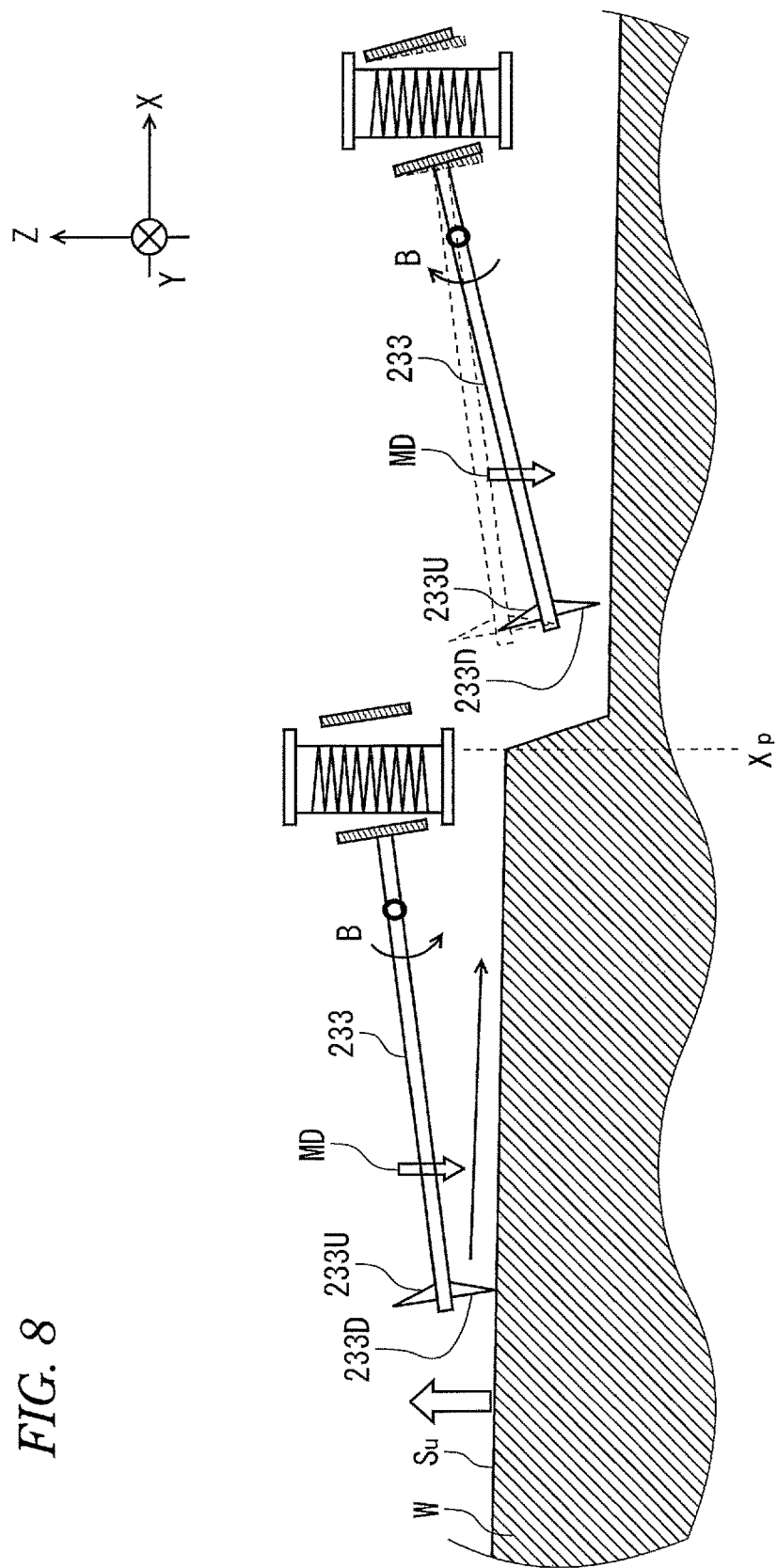
FIG. 8 is a drawing which shows a way in which a measured surface having a large inclination angle is traced to measure a property thereof.
Figure 9:
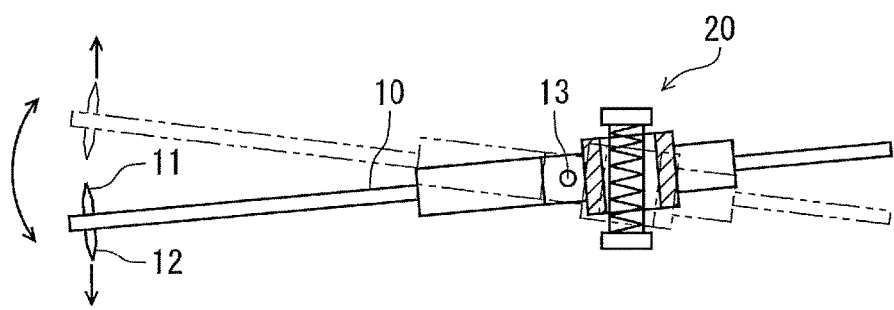
FIG. 9 is a drawing which shows a measuring arm of a surface property measuring apparatus according to a background art.

Next, a case is considered where there exists a large inclination in the measured surface S and the inclination angle thereof exceeds the following limit angle. A large inclination exists in the upward measured surface $S_U$ shown in FIG. 8 in a position which lies beyond a point Xp. The tracing of the upward measured surface $S_U$ by the stylus 233D is executed in the same way as the way described in the "Tracing Measurement Operation (Part 1)" described above until the point Xp.

Just after passing through the point Xp, the stylus 233D is about to enter the large inclination. The inclination angle of this inclination is so large that the lowering operation of the stylus 233D by the Z-axis driving mechanism 270 cannot follow the speed at which the stylus 233D is moved to trace the upward measured surface $S_U$ by the X-axis driving mechanism 280. Then, the roughness measuring instrument 230 cannot follow the upward measured surface $S_U$, whereby the stylus 233D moves away from the upward measured surface $S_U$. Then, the upward reaction force from the upward measured surface $S_U$ is lost, whereby the measuring arm 233 starts to fall.

When the measuring arm 233 starts to fall, the distal end of the measuring arm 233 is displaced downwards quickly. However, in this moment, the quick downward displacement of the measuring arm 233 is detected by the displacement detector 235, a displacement signal pulse detected is inputted into the frequency-voltage conversion circuit 420 and the determination circuit 460. Then, determining that the frequency of the displace detection pulse exceeds the frequency threshold, the determination circuit 460 turns on (or closes) the switch unit 430. At the same time the frequency-voltage conversion circuit 420 converts the frequency of the displacement detection pulse into a feedback voltage signal $V_B$ according thereto.

Consequently, in the subtraction module 440, a control voltage $V_C$ is generated as a voltage which results from the feedback voltage $V_B$ being subtracted from the measuring force command voltage $V_A$. This feedback voltage $V_B$ generates in the measuring force application unit (the voice coil motor) 240 a force (indicated by an arrow B in FIG. 8) which lifts up the distal end of the measuring arm 233 upwards, and this force prevents the fall of the measuring arm 233 even though the inclination angle of the upward measured surface $S_U$ is so large that the stylus 233D moves away from the upward measured surface $S_U$. Namely, a situation is avoided in which the fall of the measuring arm 233 brings the stylus 233D into collision with the upward measured surface $S_U$.

When the feedback is given to suppress the quick and drastic downward displacement (fall) of the measuring arm 233, the feedback voltage signal $V_B$ which is outputted from the frequency-voltage conversion circuit 420 is reduced gradually. In addition, when the frequency of the displacement detection pulse becomes equal to or less than the frequency threshold, the determination circuit 460 turns off (or opens) the switch unit 430. Consequently, the feedback control loop is automatically off.

A configuration may be adopted in which in the event that the determination circuit 460 determines that the frequency of the displacement detection pulse exceeds the frequency threshold, the central control module 320 is informed of to that respect, so that the measuring operation is interrupted by a command from the central control module 320.

The following advantages will be provided by the first embodiment that is configured in the way described heretofore.

(1) The displacement detection pulse detected at the displacement detector 235 is fed back to the frequency-voltage conversion circuit 420 and the determination circuit 460, and when the frequency of the displacement detection pulse exceeds the frequency threshold, the feedback is turned on (closed). Consequently, even though the measuring arm 233 starts to fall quickly, the fall is suppressed quickly, avoiding the accident in which the fall of the measuring arm 233 brings the stylus 233D into collision with the measured object W.

(2) In this embodiment, the determination circuit 460 and the switch unit 430 are provided, and the switch unit is turned on (or closed) only when the frequency of the displacement detection pulse exceeds the frequency threshold. Namely, the feedback control is off when the normal tracing measurement is operated, and the feedback control is designed to be on only when it is necessary. It is considered that with the feedback control kept on at all times, it is possible to prevent the fall of the measuring arm 233 in an ensured fashion and the necessity of provision of the determination circuit 460 and the switch unit 430 is obviated (JP-A-2012-225742 discloses a measuring posture and measuring force control circuit having neither a determination circuit nor a switch unit).

However, in the event that the feedback control is on at all times, the control current I which is applied to the measuring force application unit (the voice coil motor) 240 varies every time minute vertical movements of the styluses 233D, 233U are present. This causes a variation in measuring force, and hence possibly results in a measuring error. Additionally, in the event that the feedback control is kept on at all times, a delay in response should be taken into consideration, and hence, the tracing speed cannot be made quick, resulting in difficulty with which the measuring efficiency is enhanced.

In this respect, according to the embodiment, the determination circuit 460 and the switch unit 430 are provided, and the feedback control is kept off (opened) while the normal tracing measurement is performed. Consequently, the measuring force becomes constant according to the measuring force command from the central control module 320 during the normal tracing measurement, which stabilizes the results of the measurement.

Modified Example 1

In the first embodiment, the control is executed in which the frequency of the displacement detection pulse signal outputted from the displacement detector is monitored, and the feedback control is turned on (closed) when the frequency exceeds the frequency threshold.

The monitoring target may be switched from the "frequency of the displacement detection pulse signal" to the displacement speed of the measuring arm, that is, the displacement speed of the styluses 233U, 233D. Namely, the moving speed of the stylus 233 including the direction, upward or downward, thereof is monitored, and the feedback control is turned on (or closed) when it is detected that the measuring arm (in other words, the stylus 233D) falls downwards at a predetermined speed threshold or faster. In this case, the displacement detection pulse signal which is outputted from the displacement detector is not directly fed back to the measuring force control module but is fed back to the measuring force control module, for example, after it is converted into a speed value at the detection circuit module 340. In addition, in place of the frequency-voltage conversion circuit, a speed-voltage conversion circuit is adopted which outputs a voltage according to the speed value. Even with this modified example, it is understood that by detecting the fall of the measuring arm 233 (the styluses 233U, 233D), the quick downward displacement (fall) of the measuring arm 233 (the styluses 233U, 233D) can be suppressed.

However, compared with the first embodiment, it is said that the first embodiment is preferable.

In the event that the displace detection pulse signal is directly made use of as the feedback signal as in the first embodiment, the response speed becomes extremely fast.

On the other hand, in the event that the process is interposed in which the displacement detection pulse signal is converted into speed as in Modified Example 1, the response speed becomes slow accordingly.

The direction of the displacement of the measuring arm 233 (the styluses 233U, 233D) or whether the measuring arm (the styluses 233U, 233D) is displaced downwards or upwards cannot be identified only by the magnitude of the frequency of the displacement detection pulse signal.

However, the situation in which the measuring arm 233 is displaced unintentionally in a quick and drastic fashion is caused mainly by the fall of the measuring arm 233 due to the gravity, and there is caused a fear that the fall of the measuring arm 233 (the stylus 233D) as a result of the gravity leads to a collision thereof with the measured object W.

On the contrary, let's assume that the stylus 233U is biased upwards relative to the downward measured surface $S_D$ to trace the downward measured surface $S_D$ for measurement.

In this case, even though the inclination angle of the downward measured surface $S_D$ is so large that the measuring arm 233U cannot follow the downward measured surface $S_D$, there is caused no such situation that the stylus 223U collides with the downward measured surface $S_D$.

When considering in this way, it is seen that the collision of the stylus 233D with the upward measured surface $S_U$ can be prevented by adopting the configuration in the first embodiment in which the displacement detection pulse signal is directly used as the feedback signal and the feedback signal acts to lift up the measuring arm 233 upwards. Moreover, in the event that the displacement detection pulse signal is used directly as the feedback signal, there is also provided an advantage that the response speed becomes fast and the configuration is simplified.

It is noted that the invention is not limited to the embodiment and its modified example that have been described heretofore and hence can be modified as required without departing from the spirit and scope thereof.

In mounting the voice coil motor 240 on the measuring arm 233, a configuration may be adopted in which the magnet 241 is provided fixedly (for example, to the bracket) and the voice coil 242 is mounted on the measuring arm 233. An actuator which makes use of a piezoelectric element can be used as the measuring force application unit 240 in addition to the voice coil motor.

The determination circuit 460 may execute not only the on/off control of the switch unit 430 but also the on/off control of the frequency-voltage conversion circuit 420. Namely, a configuration may be adopted in which the determination circuit 460 turns on (activates) the frequency-voltage conversion circuit 420 only when the frequency of the displacement detection pulse signal exceeds the frequency threshold and turns off (stops) the frequency-voltage conversion circuit 420 when the frequency of the displacement detection pulse signal is equal to or less than the frequency threshold. When the determination circuit 460 executes the on/off control of the frequency-voltage conversion circuit 420, the switch unit 430 may be omitted.

In the first embodiment, the frequency-voltage conversion circuit 420 is provided in the measuring force control module 400, and the frequency-voltage conversion circuit 420 generates the voltage signal $V_B$ according to the frequency of the displacement detection pulse signal. As this occurs, as the frequency of the displacement detection pulse signal becomes higher, a larger voltage signal $V_B$ is generated accordingly, and therefore, there is provided an advantage that a feedback according to a falling condition of the measuring arm 233 is provided.

Here, only the suppression of the quick and drastic fall of the measuring arm 233 is taken into consideration, the voltage signal $V_B$ does not have to be a value according to the frequency of the displace detection pulse signal and hence should be a voltage value which can somehow prevent the fall of the measuring arm 233 or mitigate the falling speed of the measuring arm 233. Consequently, in this case, the displacement detection pulse signal is inputted into the feedback signal generation module, and the feedback signal generation module should be such as to output a predetermined voltage value.

In the embodiment, the measuring force control module 400 is configured as an analog circuit. Namely, the measuring force command is first converted into the analog signal at the digital-analog converter 410, whereafter the feedback voltage $V_B$ is subtracted from the measuring force command voltage $V_A$. In contrast with this, the subtraction process may, of course, be executed as the digital operation. The feedback signal should be generated as a digital signal, so that the feedback signal is subtracted from the measuring force command through a digital logic operation.

In addition, the measuring force control module 400 may be made up of a CPU and a memory, and respective functions of the measuring force control module may be realized in a software fashion by a predetermined program.

What is claimed is:

1. A surface property measuring apparatus comprising:
    a roughness measuring instrument configured to measure a surface property of a measured surface of a measured object by tracing the measured surface while being kept in contact with the measured surface, the roughness measuring instrument including:
        a measuring arm supported so as to make an arc-like movement about a rotating shaft as a fulcrum;
        a stylus provided at a distal end of the measuring arm;
        a displacement detector configured to detect a displacement of the measuring arm which occurs as a result of the measuring arm having made an arc-like movement; and
        a measuring force application unit configured to bias the measuring arm in a direction in which the measuring arm makes an arc-like movement to thereby apply a measuring force to the stylus;
    a relative moving mechanism configured to move the roughness measuring instrument and the measured object three-dimensionally relative to each other so that the roughness measuring instrument traces the measured surface; and
    a control unit configured to control operations of the roughness measuring instrument and the relative moving mechanism, the control unit including:
        a measuring force command module configured to output a measuring command which designates a direction and a magnitude of the measuring force; and
        a measuring force control module configured to control the direction and magnitude of the measuring force which is generated by the measuring force application unit by issuing a control signal to the measuring force application unit, wherein
    the displacement detector outputs a displacement detection pulse whose frequency varies based on a speed of the measuring arm;
    the measuring force control module monitors the detected displacement from the displacement detector and issues the control signal to the measuring force application unit, the control signal instructing the measuring force application unit to generate therein the measuring force,
    the measuring force control module comprises a determination circuit which receives the displacement detection pulse from the displacement detector and determines whether or not a speed of the detected displacement of the measuring arm exceeds a predetermined threshold based on the frequency of the received displacement detection pulse,
    the measuring force control module applies a feedback to the control signal so as to instruct the measuring force application unit to generate therein a force in a direction in which the distal end of the measuring arm is raised upwards when the determination circuit determines that the speed of the detected displacement of the measuring arm exceeds the predetermined threshold, and
    the measuring force control module stops applying the feedback to the control signal when the determination circuit determines that the speed of the detected displacement of the measuring arm is equal to or slower than the predetermined threshold.

2. The surface measuring apparatus according to claim 1, wherein:
    the measuring force control module further comprises:
        a measuring force command voltage generation module configured to generate a measuring force command voltage which is a voltage signal according to a value of the measuring force command;
        a feedback signal generation module configured to generate a feedback signal which is a voltage signal which instructs the measuring force application unit to generate therein a force in a direction in which the distal end of the measuring arm is raised upwards; and
        a subtraction unit configured to subtract the feedback signal from the measuring force command voltage; and
            the determination circuit inputs the feedback signal into the subtraction unit when the determination circuit determines that the displacement speed of the measuring arm exceeds the predetermined threshold.

3. The surface property measuring apparatus according to claim 2, wherein
    the feedback signal generation module is made up of a frequency-voltage conversion circuit which generates a voltage signal according to a frequency value of the displacement detection signal from the displacement detector.

4. The surface property measuring apparatus according to claim 2, wherein:
    a switch unit is provided between the feedback signal generation module and the subtraction unit; and
    the determination circuit turns on the switch unit when the displacement speed of the measuring arm exceeds the predetermined threshold, whereas when the displacement speed of the measuring arm is equal to or slower than the predetermined threshold, the determination circuit turns off the switch unit.

5. The surface property measuring apparatus according to claim 1, wherein the measuring force control module stops applying the feedback to the control signal when the determination circuit determines that the speed of the detected displacement of the measuring arm is equal to or slower than the predetermined threshold in a state that the feedback is applied after the speed of the detected displacement of the measuring arm exceeds the predetermined threshold.

6. The surface property measuring apparatus according to claim 1, wherein
    the determination circuit determines whether or not the frequency of the displacement detection pulse exceeds the predetermined threshold,
    the measuring force control module applies the feedback to the control signal when the determination circuit determines that the frequency of the displacement detection pulse exceeds the predetermined threshold, and the measuring force control module stops applying the feedback to the control signal when the determination circuit determines that the frequency of the displacement detection pulse is equal to or lower than the predetermined threshold.

7. A method for controlling a surface property measuring apparatus comprising: a roughness measuring instrument having a measuring arm which is supported so as to make an arc-like movement about a rotating shaft as a fulcrum, a stylus which is provided at a distal end of the measuring arm, a displacement detector configured to detect a displacement of the measuring arm configured to occur as a result of the measuring arm making an arc-like movement, and a measuring force application unit configured to bias the measuring arm in a direction in which the measuring arm makes an arc-like movement to thereby apply a measuring force to the stylus; and a relative moving mechanism configured to move the roughness measuring instrument and a measured object three-dimensionally relative to each other so that the roughness measuring instrument traces a measured surface of the measured object therealong, the method comprising:

outputting, by the displacement detector, a displacement detection pulse whose frequency varies based on a speed of the measuring arm;

controlling a direction and a magnitude of the measuring force which is generated by the measuring force generation unit by issuing a control signal based on a measuring force command which designates the direction and magnitude of the measuring force to the measuring force application unit;

monitoring the detected displacement from the displacement detector;

issuing the control signal to the measuring force application unit, the control signal instructing the measuring force application unit to generate therein the measuring force;

receiving the displacement detection pulse from the displacement detector;

determining whether or not a speed of the detected displacement of the measuring arm exceeds a predetermined threshold based on the frequency of the received displacement detection pulse;

applying a feedback to the control signal so as to instruct the measuring force application unit to generate therein a force in a direction in which a distal end of the measuring arm is raised upwards when the speed of the detected displacement of the measuring arm exceeds the predetermined threshold; and stopping applying the feedback to the control signal when the speed of the detected displacement of the measuring arm is determined to be equal to or slower than the predetermined threshold.

8. The method according to claim 7, wherein the application of the feedback to the control signal is stopped when the speed of the detected displacement of the measuring arm is equal to or slower than the predetermined threshold in a state that the feedback is applied after the speed of the detected displacement of the measuring arm exceeds the predetermined threshold.

9. The method according to claim 7, wherein
the determining includes determining whether or not the frequency of the displacement detection pulse exceeds the predetermined threshold,
the applying includes applying the feedback to the control signal when the frequency of the displacement detection pulse exceeds the predetermined threshold, and
the stopping includes stopping applying the feedback to the control signal when the frequency of the displacement detection pulse is determined to be equal to or lower than the predetermined threshold.

* * * * *